United States Patent
Kurabayashi et al.

[11] Patent Number: 6,141,035
[45] Date of Patent: Oct. 31, 2000

[54] VIDEO SIGNAL PROCESSING AND APPARATUS THEREFOR

[75] Inventors: Kazuyo Kurabayashi; Nobuhito Matsushiro, both of Tokyo, Japan

[73] Assignee: Oki Data Corporation, Tokyo, Japan

[21] Appl. No.: 09/082,612

[22] Filed: May 20, 1998

[30] Foreign Application Priority Data

May 21, 1997 [JP] Japan ................................ 9-147117

[51] Int. Cl.⁷ .................................................. H04N 13/00
[52] U.S. Cl. .............................. 348/42; 348/43; 348/46; 345/952
[58] Field of Search .................. 348/42, 46, 47, 348/43, 51, 39, 135; 345/952; 382/154; 340/435, 903; H04N 13/00

[56] References Cited

U.S. PATENT DOCUMENTS

| | | | |
|---|---|---|---|
| 5,220,441 | 6/1993 | Gerstenberger | 348/42 |
| 5,530,420 | 6/1996 | Tsuchiya et al. | 340/435 |
| 5,625,408 | 4/1997 | Matsugu et al. | 348/42 |
| 5,652,616 | 7/1997 | Chen et al. | 348/43 |
| 5,714,997 | 2/1998 | Anderson | 348/39 |
| 5,727,078 | 3/1998 | Chupeau | 382/154 |
| 5,745,126 | 4/1998 | Jain et al. | 345/952 |

*Primary Examiner*—Chris S. Kelley
*Assistant Examiner*—Tung Vo
*Attorney, Agent, or Firm*—Rabin & Champagne, P.C.

[57] ABSTRACT

When the corresponding position of each pixel in stereo video pair is searched, a fixed pixel is set in one side video and the corresponding pixel is set in the other side video. Then, a window is set around the fixed pixel in one side video and a same size window is set around the corresponding pixel in the other side video. Selectable and plural kinds of window size are prepared at that moment.

Pixel values are compared with each other respectively. The MDL standard value is adopted as for an evaluation standard. In the comparison, the smaller the MDL standard value of the window size, the more suitable the window size. All pixel values in the window are used for parameters to calculate the MDL standard value. The MDL standard value contains the value which is equivalent to error quantity in case of comparing each pixel in the window, it also indicates resemblance of the video picture in the windows. The corresponding pixel having the minimum MDL standard value is supposed to be the corresponding position of the fixed pixel. In this way, searching the corresponding point can be performed based on the comparison results in the most suitable model.

7 Claims, 8 Drawing Sheets

| INDEX | WINDOW SIZE |
|---|---|
| 0 | 3 x 3 |
| 1 | 9 x 9 |
| 2 | 17 x 17 |
| 3 | 33 x 33 |

Window Size Table
(a)

| ADDRESS | MDL standard value |
|---|---|
| 0 | MDL (3 x 3) |
| 1 | MDL (9 x 9) |
| 2 | MDL (17 x 17) |
| 3 | MDL (33 x 33) |

Pixel MDL Register
(b)

| ADDRESS | MDL standard value |
|---|---|
| 0 | min MDL (x 1, 0) |
| 1 | min MDL (x 1, 1) |
| ⋮ | ⋮ |
| M-1 | min MDL (x 1, M-1) |

Line MDL Register
(c)

| ADDRESS | MDL standard value | relative position |
|---|---|---|
| 0 | min MDL (x1, 0) | D (x1, 0) |
| 1 | min MDL (x1, 1) | D (x1, 1) |
| --- | --- | --- |
| M-1 | min MDL (x1, M-1) | D (x1, M-1) |

Line MDL Register
(a)

| culmulative MDL standard value | relative position group |
|---|---|
| MDL (0,0) +MDL (1,1) +···+MDL (M-1, M-1) | D (0,0), D (1,1), ···, D (M-1, M-1) |
| MDL (0,0) +MDL (1,2) +···+MDL (M-1, M-1) | D (0,0), D (1,2), ···, D (M-1, M-1) |
| --- | --- |
| MDL (0, M-1) +MDL (1, M-1) +···+MDL (M-1, M-1) | D (0,M-1), D (1,M-1), ···, D (M-1, M-1) |

Cumulative MDL Register
(b)

VIDEO SIGNAL PROCESSING AND APPARATUS THEREFOR

BACKGROUND OF THE INVENTION

1. Field of the Invention

The present invention relates to a video signal processing method for searching corresponding points of stereo video pair and apparatus for processing.

2. Description of Prior Arts

Recently, in appreciating stereo video, technology utilizing parallax of both eyes to watch stereo video on video display is well known. Stereo video pair means a pair of video pictures taken from each eye position of left and right. When we watch stereo video pair with each eye for corresponding each video picture of the stereo video pair, we perceive the subject three dimensionally, uniting the two video pictures of stereo video pair. In addition, the video signal processing method for searching corresponding points of stereo video pair and processor is known. When an optional pixel in one side video picture composing stereo video pair is defined as a fixed pixel, the corresponding point means the pixel corresponding to the fixed pixel in the other side video picture. That is the pixel which corresponds to the same point of the same subject in the same video picture. We can get three dimensional information by calculating the difference between coordinates, regarding each pair of corresponding pixels in stereo video pair. This can be applied to the three dimensional measurement of the subject.

Same size comparing area(called "window" hereinafter) are set in both pictures of stereo video pair. Corresponding pixels are searched by comparing the similarity of the both windows. To compare similarity, there is a method to get sum of squared difference between each corresponding pixel value in both windows. This is called SSD(Sum of Squared Difference) method. When the sum of squared difference is minimum under the condition that the window of one side is fixed and the one of the other side is moved up and down and left and right in video, it is judged that the pixels in both windows are most similar.

Method for searching corresponding points, using SSD (Sum of Squared Difference) is proposed in thesis, for an example, "Stereo Matching using Plural Standard Lines" on p1317~1327 in the Transactions of the Institute of Electronics, Information and Communication Engineers DII Vol.J75-D-II August 1992. This is the method to get, using different standard lines in stereo video pair, all sum of each corresponding point pair distance inverse square sum SSD. With this method high accurate search for corresponding points is possible.

The above mentioned technology has the following problems to improve.

When searching corresponding points in comparing SSD of windows, in case that the pixel values in the windows are not varied and the density difference is small, if the window size is small, it sometimes happens that similar windows increase and the probability of false corresponding becomes large. On the other hands, when the size of windows is smaller, the more accurate is the comparison result of SSD on the edge part of the subject of which density difference is large. Namely, when the window is enlarged, searching accuracy becomes worse, because the pixel value difference in other part effects on SSD considerably.

However, with usual method for searching corresponding points in stereo video pair, satisfactory accuracy cannot be obtained, because a fixed window sizes are used.

SUMMARY OF THE INVENTION

It is therefore a principal object of the present invention to avoid the disadvantages of the prior art.

According to the one aspect of the invention, there is provided a method which is a video signal processing method used for a stereo video including a standard video having a plurality of pixels and a corresponding video having a plurality of pixels corresponding thereto, for detecting a corresponding pixel in the corresponding video which corresponds to a standard pixel in the standard video, the video processing method comprising the steps of preparing a standard window with a given size, surrounding a standard pixel among the plurality of pixels in the standard video, selecting a plurality of candidate pixels among the plurality of pixels in the corresponding video, preparing a plurality of candidate windows, each having the same size as the standard window and surrounding each candidate pixel in the corresponding video, calculating a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window and identifying the candidate pixel surrounded by the candidate window having the smallest MDL value as the pixel corresponding to the standard pixel.

In the preferred mode of the invention, the MDL standard value is calculated by the following operational equation.

$$MDL = \frac{1}{n}\left\{-\log_e Q + \frac{1}{2}K\log_e n\right\} \quad (1)$$

$K$: numbers of model parameter, $$q_k = \frac{1}{\sqrt{2\pi a^2}} \exp\left(-\frac{\varepsilon_k^2}{2\sigma^2}\right)$$

$n$: numbers of prediction error, $\varepsilon_k = Y_{Lk} - Y_{Rk}, \quad (i = 1, 2, \cdots, n)$ $Q = q_1 q_2 \cdots q_n, \quad \sigma^2 = \frac{1}{n}\sum_{k=1}^{n} ek$ According to the another aspect of the invention, there is provided a method which is a video signal processing method used for a stereo video including a standard video having a plurality of pixels and a corresponding video having a plurality of pixels corresponding thereto, for detecting a corresponding pixel in the corresponding video which corresponds to a standard pixel in the standard video, the video processing method comprising the steps of selecting a standard pixel column, including plurality of neighboring standard pixels being lined up in the standard video and selecting the corresponding pixel column, including the same number of neighboring corresponding pixels being lined up in the corresponding video, preparing a standard window with a given size surrounding a standard pixel among the plurality of pixels in the standard pixel column, selecting a plurality of candidate pixels among the plurality of pixels in the corresponding pixel column, preparing a plurality of candidate windows, each having the same size as the standard window and surrounding each candidate pixel in the corresponding video, calculating a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window and identifying the candidate pixel surrounded by the candidate window having the smallest MDL value as the pixel corresponding to the standard pixel.

In the preferred mode of the invention, the standard pixels are permitted to be repeatedly selected, and the corresponding pixels are permitted to be repeatedly prepared.

In the preferred mode of the invention, the corresponding pixels are prepared within restricted condition to prevent inconsistency in arrangement of selecting the pair of the standard pixel and corresponding pixel.

According to another aspect of the invention, there is provided a computer readable memory medium storing computer program to execute the video signal processing, the features of which is to have step of preparing a stereo video including a standard video having a plurality of pixels and a corresponding video having a plurality of pixels corresponding thereto, for detecting a corresponding pixel in the corresponding video which corresponds to a standard pixel in the standard video, preparing a standard window with a given size surrounding a standard pixel among the plurality of pixels in the standard video, selecting a plurality of candidate pixels among the plurality of pixels in the corresponding video, preparing a plurality of candidate windows, each having the same size as the standard window and surrounding each candidate pixel in the corresponding video, calculating a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window and identifying the candidate pixel surrounded by the candidate window having the smallest MDL value as the pixel corresponding to the standard pixel.

According to another aspect of the invention, there is provided a video signal processing apparatus which includes memory which stores a stereo video including a standard video having a plurality of pixels and a corresponding video having a plurality of pixels corresponding thereto, for detecting a corresponding pixel in the corresponding video which corresponds to a standard pixel in the standard video, and calculator which prepares a standard window with a given size surrounding a standard pixel among the plurality of pixels in the standard video, selects a plurality of candidate pixels among the plurality of pixels in the corresponding video, prepares a plurality of candidate windows, each having the same size as the standard window and surrounding each candidate pixel in the corresponding video, calculates a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window, and identifying the candidate pixel surrounded by the candidate window having the smallest MDL value as the pixel corresponding to the standard pixel.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

DESCRIPTION OF THE PREFERRED EMBODIMENTS

In the present invention, when the corresponding position of each pixel in stereo video pair is searched, a fixed pixel is set in one side video of stereo video pair and the corresponding pixel is set in the other side video of stereo video pair. Then, a window is set around the fixed pixel in one side video and a same size window is set around the corresponding pixel in the other side video. According to the present invention, selectable and plural kinds of window size are prepared at that moment.

Among all kinds of window sizes, pixel values are compared with each other respectively over and over. In the present invention, the MDL standard value is adopted as for an evaluation standard. In the comparison, the smaller the MDL standard value of the window size, the more suitable the window size. All pixel values in the window are used for parameters to calculate the MDL standard value. For example, 4 kinds of window size are prepared to compare, the window size getting the minimum value of the MDL standard value in that comparison can be regarded as the most suitable size for comparing the standard pixel with the corresponding pixel. Besides, because the MDL standard value contains the value which is equivalent to error quantity in case of comparing each pixel in the window, it also indicates resemblance of the video picture in the windows.

By selecting all possible pixels from the other side video to compare with the pixels in the original video picture among each same window size of all kinds, the MDL standard value groups having a minimum value respectively are found. The minimum value can be searched among this MDL standard value groups. The corresponding pixel having the minimum MDL standard value is supposed to be the corresponding position of the fixed pixel. In this way, searching the corresponding point can be performed based on the comparison results in the most suitable model (window of the most suitable window size).

Hereinafter, the embodiment according to this invention will be now described in detail with reference to the accompanying drawings.

Hereinafter, the preferred embodiments of video signal processing and its apparatus according to the present invention will be described in detail with reference to the accompanying drawings.

First Embodiment

Figure 1:
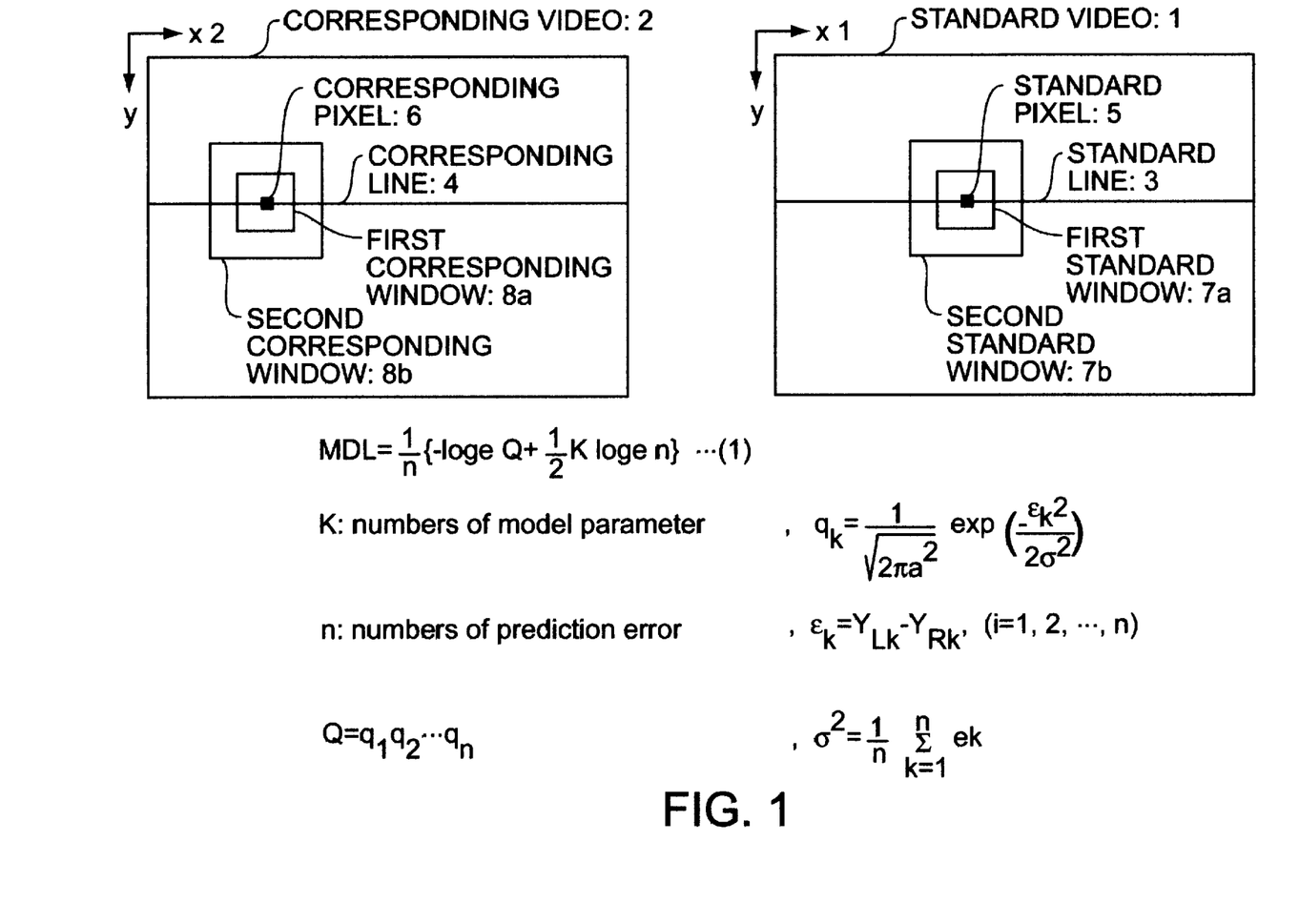
FIG. 1 is an explanation outline illustrating the first embodiment video signal processing.

FIG. 1 is the explanation diagram which explains briefly the video signal processing method.

As shown in FIG. 1, stereo video pair consists from standard video 1 and corresponding video 2 taken from two positions which are different in horizontal direction. Standard video 1 is the picture taken from right eye position and corresponding video 2 is the one taken from left eye position.

According to the video signal processing method of the present invention, a window is set in standard video 1 to search the corresponding points, scanning this window in axis x 1 direction.

Standard line 3 is an optional line drawn in the standard video 1. This line is drawn in parallel with axis x 1. Standard pixel 5 on standard line 3 is the fixed pixel with which comparison will be made. Now comparison between corresponding pixel 6 in corresponding video 2 is going to be executed. The corresponding line 4 in corresponding video 2 is the line drawn at the same position with standard line 3 in standard video 1. Corresponding pixel 6 is on corresponding line 4. According to this video signal processing method, searching a pixel having the nearer pixel value to the standard pixel 5 is executed on the corresponding line 4.

First of all, the first standard window 7a and the second standard window 7b are set in near area of standard pixel 5. Sizes of the first standard window 7a and the second standard window 7b are the first window. Then, similar windows are set near the corresponding pixel 6. The positions and sizes of the first corresponding window 8a and the second corresponding window 8b are disposed at the same positions and set of a size of the first standard window 7a and the second window 7b respectively.

Next, MDL(Minimum Description Length) between the first standard window 7a and the first corresponding window 8a is calculated. At the same time, MDL between the second standard window 7b and the second corresponding window 8b is calculated. As explained afterwards, this MDL standard value is used for selecting the most suitable model for comparison. Comparing the calculated MDL standard value of the pair of first standard window 7a and the first corresponding window 8a, with the another pair of the second standard window 7b and the second corresponding window 8b, either of the two is selected for the most suitable model.

For example, if the former pair is selected, the first corresponding window 8a is set around the corresponding pixel 6 on corresponding line 4. Similarly, the second corresponding window 8b is set around the corresponding pixel 6 on corresponding line 4. MDL standard values between 7a and 8a, and between 7b and 8b are calculated respectively. Most suitable window of each corresponding pixel 6 is selected, comparing the MDL standard values.

Thus, corresponding pixel 6 on the corresponding line 4 is specified, comparing MDL standard values of the selected most suitable window size.

Herein, the MDL standard value is explained. The MDL standard value is the standard value to select the most suitable model for the whole measuring symbol series, and is shown in equational in FIG. 1.

In equation (1), the first item in { }, $(-\log_e Q)$, denotes the error information quantity, in using the model. $\log_e Q$ is the logarismic index of the probability distribution in the model. It indicates the model is set more suitably when the error information quantity is smaller($-\log_e Q$). The more the number of parameter K describing the model, the more precise about the description, and the first item, $(-\log_e Q)$, becomes smaller.

The second item of { }, $(\frac{1}{2})K\log_e n$, denotes model parameter of the information quantity. $(\frac{1}{2})\log_e n$ is the necessary information quantity when measuring number is n. If model parameter K increases, the information quantity for describing model parameter increases also.

As seen above, the first and the second items of equation (1) are in the relation of trade-off. And the second item restrains that the model becomes prolix. If the MDL standard value is used for comparison standard, model without prolixity can be selected against finite number of measuring data. Further, the MDL standard value in equation (1) is normalized, dividing it with measuring number n.

n is the measuring number of prediction error $f\overline{A}k, (k=1,2,3,\ldots,n)$ between the pixels of the same position in standard video and corresponding video, and denotes the number of pixel in the window.

Model parameter denotes the position of the standard pixels 5 and the corresponding pixel 6 in each video, namely, expressed x axis of which the direction is the main scanning direction, y axis of which the direction is the duplicate scanning direction and the dispersion($fD2$) of prediction error $f\overline{A}k$. Number of model parameter K=3.

Q, probability density function of the errors, is the product of q 1□qn, supposing that the each probability density function qk of the each probability variable (prediction error) $f\overline{A}k$ is independent with each other.

The probability density function qk is supposed to be normal distribution.

Dispersion $fD2$ is regarded to be the mean value of $f\overline{A}2 \sim f\overline{A}n2$, supposing that mean value of $f\overline{A}k$ equals 0.

Figure 2:
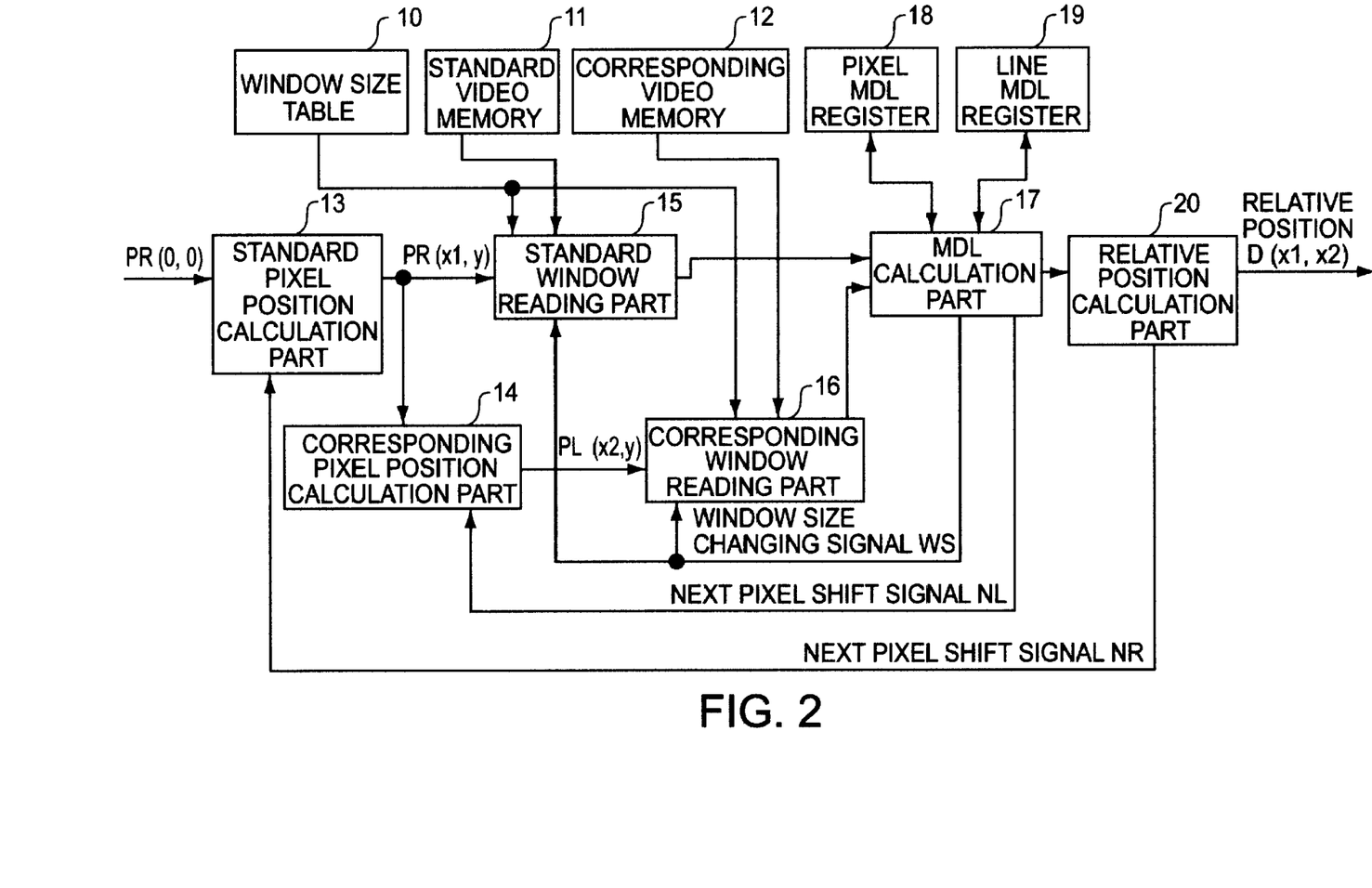
FIG. 2 is a block diagram illustrating the construction of the first embodiment video signal processing apparatus.

Next, the video signal processing apparatus which realizes the above mentioned video signal processing will be described hereinafter. As shown in FIG 2, the video signal processing comprises window size table 10, standard video signal memory 11, corresponding video signal memory 12, standard pixel position calculation unit 13, corresponding pixel position calculation unit 14, standard window reading unit 15, corresponding window reading unit 16, MDL calculation unit 17, pixel MDL register 18, line MDL register 19 and relative position calculation unit 20.

Figure 3:
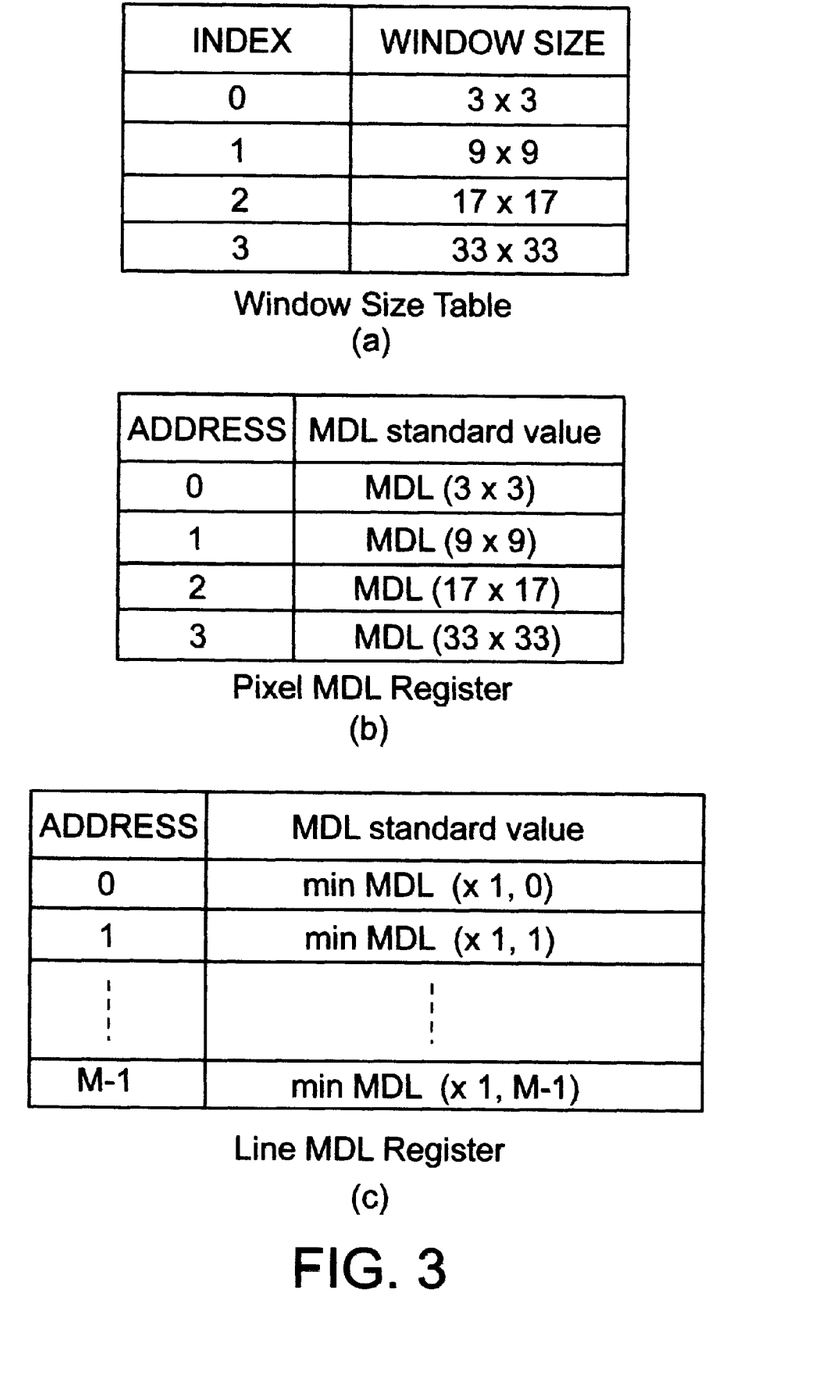
FIG. 3 is an explanation diagram explaining window size table, pixel MDL register and the memory range of line MDL register shown in FIG. 2.

In window size table 10, four kinds of window size are registered. As shown in FIG 3(a), four kinds of window size: 3 pixels×3 pixels, 9 pixels×9 pixels, 17 pixels×17 pixels and 33 pixels×33 pixels are registered, and index 0 3 are allotted respectively. When standard pixel 5 is selected, a standard window which size registered in this window size table 10 is set. And when a corresponding pixel 6 is selected, a similar corresponding window is set.

In standard video memory 11, standard video 1 whose pixels placed in N line and M column is memorized, and in the corresponding video memory 12, corresponding video 2 whose pixels placed in N line and M column is memorized.

Standard pixel position calculation unit 13 calculates the position of standard pixel 5, and outputs it to corresponding pixel position calculation unit 14 and to standard window reading unit 15.

Concerning the coordinates of the standard video 1 in FIG 1, it is assumed that main scanning direction is x1 and duplicate scanning direction is y. The position of standard pixel is expressed as PR(x1, y). Similarly, in corresponding video 2, scanning direction is defined to express as x2 and duplicate scanning direction as y. The position of corresponding pixel is defined to express as PL(x2, y).

In standard pixel position calculation unit 13, PR(0, 0) is input for initial value, and the head pixel of the first line in standard video 1 is set as standard pixel 5. After that, each pixel in standard video 1 is selected for standard pixel 5 in turn at every time when the next pixel shift signal NR is input, incrementing the value of x1 or y of position PR(x1, y) by one. The next pixel shift signal NR is output from relative position calculation unit 20, which will be described later.

Corresponding pixel position calculation unit14 calculates the corresponding pixel 6 position PL(x2, y), based on standard pixel 5 position PR(x1, y) calculated in the standard pixel position calculation unit 13, and outputs it to the corresponding window reading unit 16.

When position PR(x1, y) is input, the corresponding pixel position calculating unit 14 selects a head pixel PL(0, y) on the same corresponding line 4 on which the position PR(x1, y) exists for the corresponding pixel 6. After that, every time when the next pixel shift signal NL is input from MDL calculation unit 17, the corresponding pixel 6 is selected, incrementing the x axis of the position PL(x2, y) of corresponding pixel 6 by one. The next pixel shift signal NL will be explained later. When the position PR(x1, y) of standard pixel is input, the standard window reading unit 15 reads out four window sizes which are registered in window size table 10. Standard window of window size table 10 is read out from standard video memory 11 and output to MDL calculation unit 16.

When the standard pixel position PR(x1, y) 5 is input, standard window reading unit 15 reads out 3 pixels×3 pixels window which is indexed 0 from window size table 10, after resetting to 0 the index value of window size table. Standard window reading unit 15 reads out standard window of the read out window size from standard video memory 11. Besides, every time when signal WS for changing window size is input from MDL calculation part 17, four window sizes are read out in order, incrementing the index value by one and changing window size.

When position PL(x2, y) of corresponding pixel 6 is input to the corresponding window reading unit 16 from the corresponding pixel position calculation unit 14, the corresponding window reading unit 16 reads out four window sizes registered in window size table 10. And, four windows corresponding with these four window sizes respectively, are read out from corresponding video memory 12 and output them to MDL calculation unit 17.

When position PL(x2, y) of corresponding pixel 6 is input to the corresponding windows reading unit 16, the corresponding windows reading unit 16 reads out window size of 3 pixels×3 pixels whereof the index value is 0 from window size table 10, after resetting the index value of window size table 10 to 0. Besides, window corresponding with the read out window size is read out from video memory 12. Every time when window changing signal WS is input, window size is changed incrementing the index value by one, and the corresponding window of four window sizes are read out from the corresponding video memory 12 in order.

Window changing signal WS is input to standard window reading unit 15 and corresponding window reading unit 16 simultaneously. Based on the window changing signal, both the standard window reading unit and corresponding window reading unit select same window size respectively registered in window size table 10.

MDL calculation unit 17 calculates MDL standard value between standard window output from standard window reading unit 15 and corresponding window output from corresponding window reading unit 16, and stores it in pixel MDL register 18.

As shown in FIG. 3(b), MDL standard values regarding four kinds of the window size which have the selected corresponding pixel 6 in common are stored in pixel MDL register 18. Definitely, (3×3) MDL corresponding standard value of 3 pixels×3 pixels MDL, (×9) MDL corresponding standard value of 9 pixels×9 pixels MDL, (17×17) MDL corresponding standard value of 17 pixels×17 pixels MDL and (33×33) MDL corresponding standard value of 33 pixels×33 pixels MDL are stored in the address 0~3 of pixel MDL register.

If four standard values of MDL corresponding four kinds of window size are not stored in pixel MDL register 18, the MDL calculation unit 17 requests to store the remaining MDL standard values, outputting window changing signal WS both to standard window reading unit 15 and corresponding window reading unit 16.

When four MDL standard values corresponding to four window sizes are stored in MDL register 18, the MDL calculation unit 17 specifies the minimum standard value of MDL among the 4 MDL standard values, and stores the specified the minimum MDL standard value in line MDL register 19 and outputs the next pixel shift signal to corresponding pixel calculation unit 14.

As described above, the most suitable window is specified every time when standard pixel is selected, and with the window size, comparison between pixel value of standard pixel and the one of every pixel on corresponding line is executed.

Hereinafter, the minimum standard value of MDL between position PR(x1, y) and PL(x2, y) is expressed as minMDL(x1, x2).

As shown in FIG.(c), minMDL(x1, x2) concerning every corresponding pixel 6 on corresponding line 4 is stored in line MDL register 19. The storing addresses for line MDL register 19 are 0 –(M–1).

When all minMDL(x1, x2) of corresponding pixel 6 on corresponding line 4 are stored in line MDL register 19, the MDL calculation unit 17 specifies the minimum minMDL (x1, x2) among the stored minMDL(x1, x2), and outputs the position PL(x, y) of corresponding pixel 6 which corresponds to the specified minMDL(x1, x2) into the relative position calculation unit 20 with PR(x, y) of the standard pixel 6. The output position PL(x, y) of this corresponding pixel 6 is the corresponding point to the standard pixel 5.

Relative position calculation unit 20 calculates the relative position between the standard pixel 5 and corresponding pixel 6 which are output from MDL calculation unit 17:

D(x1, x2)=PR(x1)–PL(x2)

and outputs the next pixel shift signal NR to standard pixel position calculation unit 13.

(Function)

Figure 4:
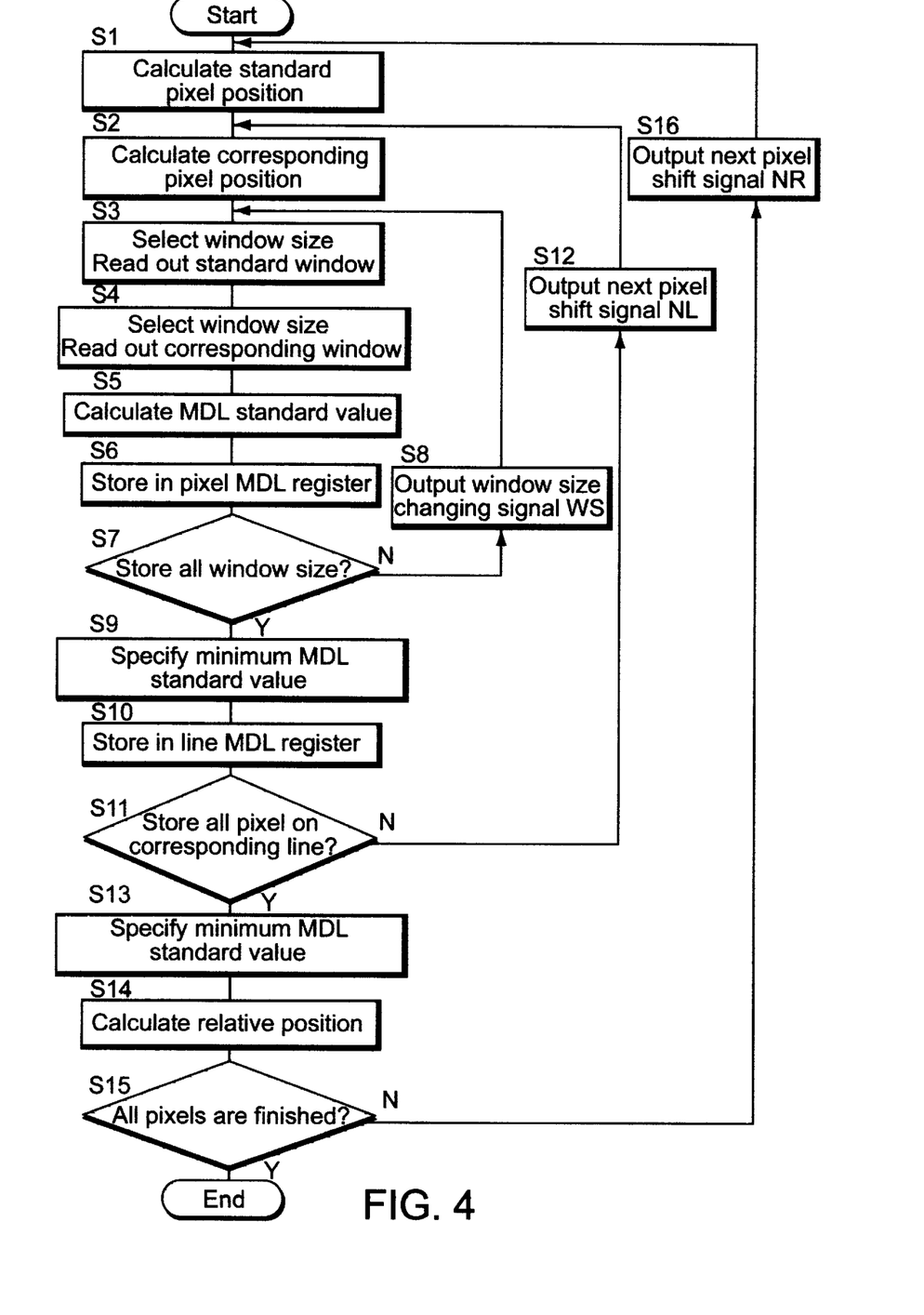
FIG. 4 is a flowchart showing the function flow of the first embodiment video signal processing apparatus.

FIG. 4 is the flowchart showing the function flow of the first embodiment of the video signal processing apparatus which is shown in FIG. 2.

First, PR(x, y) of standard pixel 5 is calculated by standard pixel calculation unit 13 and output to the corresponding pixel position calculation unit 14 and standard window reading unit 15. And when the next pixel shifting signal NR is input to standard pixel position calculation unit 13 from the MDL calculation unit 17, x1 one incremented signal of PR(x1, y) is output from the standard pixel position calculation unit 13(step S1).

Then, in the corresponding pixel position calculation unit 14, PL(x2, y) of corresponding pixel 6 on corresponding line 4, which the standard pixel 5 of the input PR(x1, y) is searching, is calculated and output to the corresponding window reading unit 16. When PR(x1, y) is input to the corresponding pixel calculation unit 14, head pixel PL(0, y) which is on the same line with PR(x1, y) is output from the corresponding pixel position calculation unit 14. And when the next pixel shift signal NL, output from MDL calculation unit 17, is input into the corresponding pixel position calculation unit 14, one incremented signal of x2 of PR(x2, y) is output from the corresponding pixel position calculation unit 14(step S2).

Then, by the standard window reading unit 15, window size is selected and standard window is read out from the standard video memory 11 and output to the MDL calculation unit 17. When PR(x1, y), output from standard pixel position calculation unit 13, is input into the standard window reading unit 15, the index value is reset to 0, however, when the window changing signal WS is input, the index value is one incremented in the standard window reading unit 15, and window size corresponding to index value is read out from window size table 10. Standard window of the read out window size is read out from standard video memory 11 (step S3).

Next, by the corresponding window reading unit 16, window size is selected and corresponding window is read out from corresponding memory 12 and output to the MDL calculation unit 17. When PL(x2, y) output from corresponding pixel position calculation unit 14 is input, index value is reset to 0, however, when the window changing signal WS is input, the index value is one incremented in corresponding window reading unit 16, and window size corresponding index value is read out from window size table 10. Corresponding window of the read out window size is read out from corresponding video memory 12(step S4).

Then, in the MDL calculation unit 17, the MDL standard value between standard window output from standard window reading unit 15 and corresponding window output from corresponding memory reading unit 16 is calculated(step S5), and the calculated MDL standard value is stored in pixel MDL register 18(step S6).

Next, by the MDL calculation unit 17, MDL standard values of 4 kinds of window size is checked to be stored in pixel MDL register 18(step S7).

In step S7, in case that the MDL standard values of 4 kinds of window size are not stored in pixel MDL register 18, window changing signal WS is output from MDL calculation unit 17 to standard window reading unit 15 and the corresponding window reading unit 16(step S8), and flow goes back to step S3.

On the other hands, in step S7, when MDL standard values of 4 kinds window size are stored in pixel MDL register 18, the minimum MDL standard value among every MDL standard value of each window size, minMDL(x1, x2), is specified(step S9), and the specified minMDL(x1, x2) is stored in the line MDL register 19(step S10).

Next, in step S11, it is checked whether minMDL(x1, x2) of all corresponding pixels 6 on corresponding line 4 are stored in the line MDL register 19 or not(step S11).

In step S81, in case that minMDL(x1, x2) of all corresponding pixels 6 on corresponding line 4 are not stored in the line MDL register 19, the next pixel shift signal NL is output from the MDL calculation unit 17 to the corresponding pixel position calculation unit 14(step S12), and flow goes back to step S2.

In step S11, when minMDL(x1, x2) of all corresponding pixels 6 on corresponding line 4 are stored in the line MDL register 19, the minimum minMDL(x1, x2) among the minMDL(x1, x2) of all corresponding pixels 6 is specified. PL(x2, y) of the corresponding pixel 6 which corresponds to the specified minimum of minMDL(x1, x2) and PR(x1, y) of standard pixel 5 are output to the relative position calculation unit 20(step S13).

Next, in the relative position calculation unit 20, relative position D(x1, x2) between standard pixel 5 and corresponding pixel 6 is calculated(step S14).

Then, it is checked whether there is next standard pixel 5 or not(step S15). In step S15, if the next standard pixel 5 is exist, the next pixel shift signal NR is output from the relative position calculation unit 20 to the standard pixel calculation unit 13(step S16), and flow goes back to step S1. On the other hands, if there is no next standard pixel 5 in standard video 1, flow ends.

Effect of First Embodiment

As described above, according to the first embodiment, MDL calculation unit 17 calculates MDL standard value between standard window of standard pixel 5 and corresponding window of corresponding pixel 6 on corresponding line 4 and the calculated MDL standard value is compared to search the corresponding pixel 6 which is similar to standard pixel 5. Consequently, high precise corresponding position can be obtained, because the corresponding position can be searched in the most suitable model.

Besides, the minimum MDL standard value, minMDL(x, y), is selected among the MDL standard values which are calculated by MDL calculation unit 17, reading out standard windows and corresponding windows from the standard window reading unit 15 and the corresponding window reading unit 16 respectively, based on the plural numbers of window size previously registered in window size table 10. As a result, according to video characteristic, searching the corresponding point becomes possible by selecting the most suitable window size. Therefore, a high precise corresponding point can be get, decreasing false corresponding. Accordingly, good reproductive three dimensional information can be obtained.

As above described, when comparing the window setting around a fixed pixel with the one setting around the corresponding pixel to calculate to find the minimum MDL standard value, there may be the case where inconsistent corresponding point is happened to be detected in a changeless and stationary screen. More definitely, here we suppose a case when a corresponding point to a standard pixel, which placed at the right side of the last standard pixel, has been detected. In this case the corresponding point of this pixel must be at the right side of the last detected corresponding point. But there may be the case that the corresponding point happens to be at the left side of the last detected corresponding point, while searching the minimum of MDL standard values. This phenomena cannot be avoided, as far as the MDL standard value is automatically calculated according to the fixed calculation rules.

The second embodiment of the present invention prevents such inconsistent results happens to occur.

Second Embodiment

Figure 5:
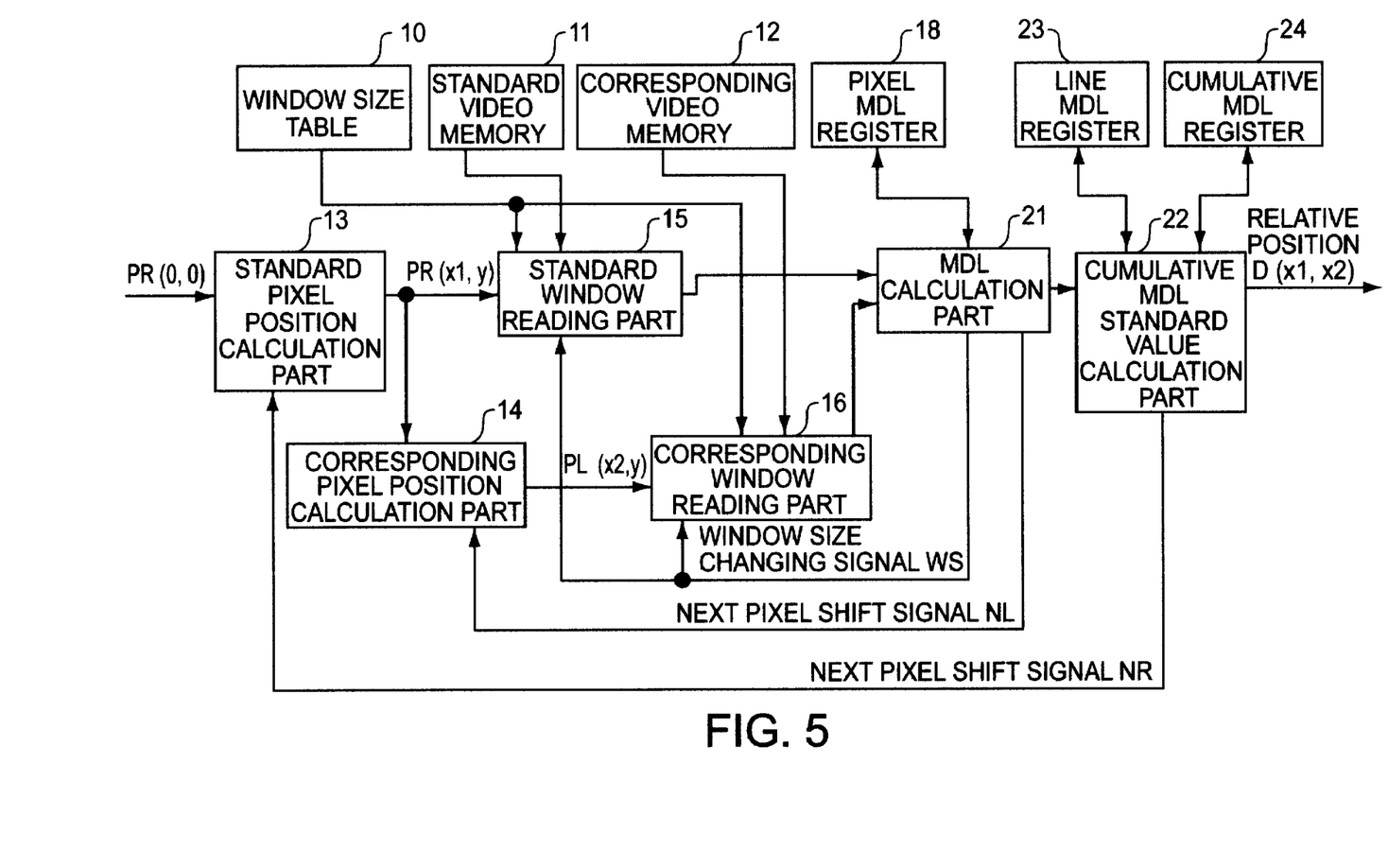
FIG. 5 is a block diagram illustrating the construction of the second embodiment video signal processing apparatus.

FIG. 5 is the block diagram which shows the component part of video signal processing apparatus of the second embodiment.

As shown in FIG. 5, concerning the video signal processing apparatus of the first embodiment shown in FIG. 2, MDL calculation unit 17, line MDL register 19 and relative position calculation unit 20 are changed with MDL calculation unit 21, cumulative MDL calculation unit 22, line MDL register 23 and cumulative MDL standard value register 24. The explanation about the components described here with the same number to the first embodiment components are omitted.

MDL calculation part 21 calculates MDL standard value between standard video window output from the standard window reading unit 15 and corresponding window from the corresponding window reading unit 16, and stores it in the pixel MDL register. In the pixel MDL register 18, MDL standard values of 4 kinds of size which correspond same position of corresponding pixel 6, are stored.

If MDL standard values of 4 kind window size are not stored in the pixel MDL register 18, the MDL calculation unit 21 outputs window changing signal WS to the standard window reading unit 15 and the corresponding window reading unit 16.

If MDL standard values of 4 kind window size are stored in pixel MDL register 18, the MDL calculation unit 21 specifies the minimum MDL standard value, minMDL(x1, x2), among 4 MDL standard values, and the specified minMDL(x1, x2) is output to the cumulative MDL calculation unit 22, with PR(x1, y) of standard pixel 5 and PL(x2, y) of corresponding pixel 6.

The cumulative MDL calculation unit 22 calculates relative position between standard pixel 5 of minMDL(x1, x2) and corresponding pixel 6, output from MDL calculation unit 21, $$D(x1, x2)=PR(x1, y)-PL(x2, y)$$

and stores it in the line MDL register 23 with minMDL(x1, x2).

Figure 6:
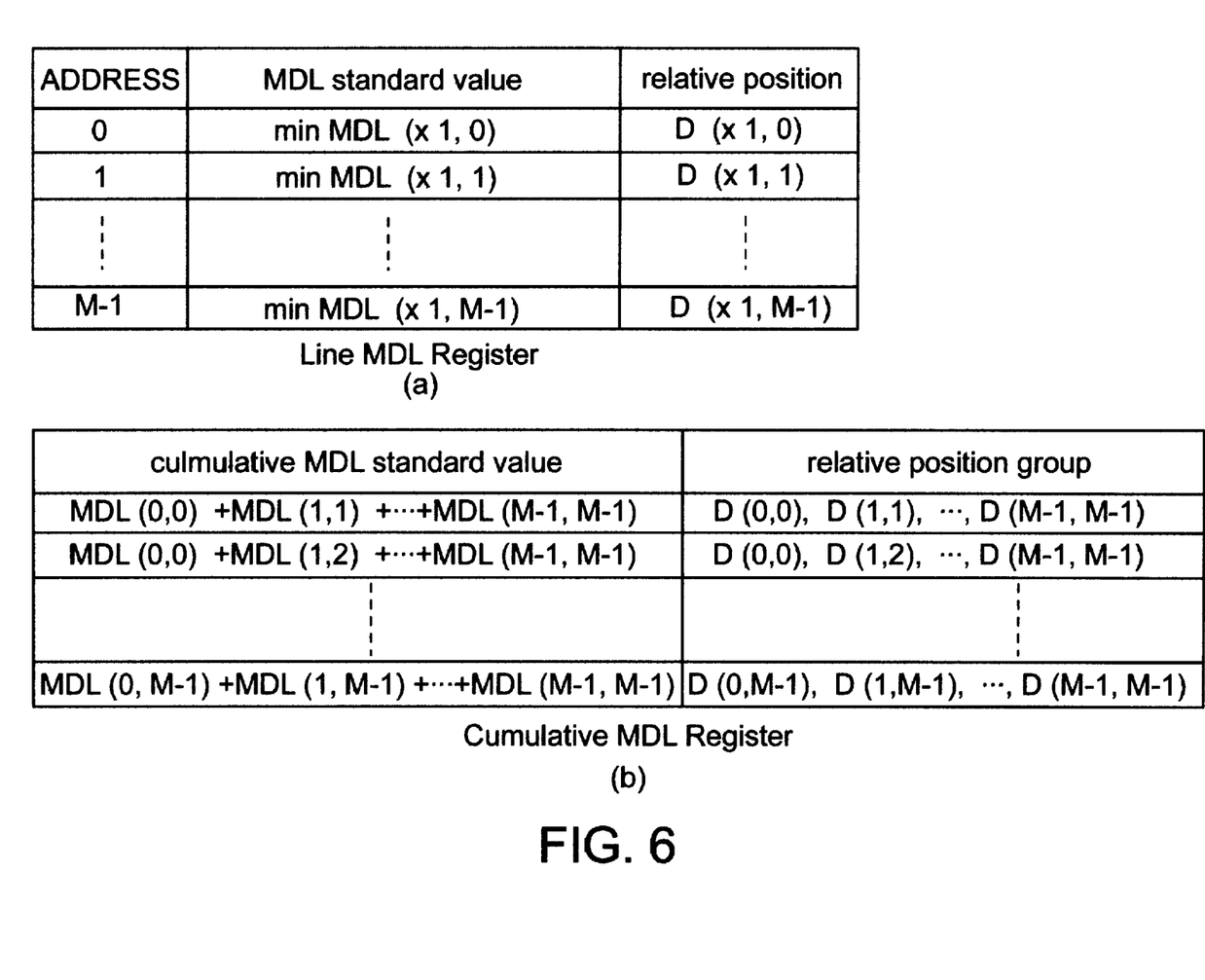
FIG. 6 is an explanation diagram explaining line MDL register and the memory range of cumulative MDL register shown in FIG. 5.

As shown in FIG. 6(a), in the line MDL register 23, minMDL(x1, x2) of all corresponding pixel 6 for one line of standard pixel 5 and relative position D(x1, x2) are stored. If minMDL(x1, x2) of every corresponding pixel 6 for one line of standard pixel 5 is not stored in line MDL register 23, the next pixel shift signal NL is output to the corresponding pixel position calculation unit 14.

Cumulative MDL calculation unit 22 calculates all summation, SMDL, of minMDL(x1, x2) for one line for all possible combination with standard pixels 5 on standard line 3 and corresponding pixels 6 on corresponding line 4. The calculated SMDL for one line and the relative position of the corresponding pixel 6 on corresponding line 6 are stored in cumulative MDL standard value register 24.

The followings explains on the combination of corresponding points. For understandable explanation, assuming that standard line 3 and corresponding line 4 have pixel columns of 3 pixels respectively. And MDL standard value between PR(x1, y) and PL(x2, y) is assumed to be expressed as MDL(x1, x2).

There are two restricting conditions concerning the combination of corresponding points. The first restricting condition is as follows. Standard video 1 is the video picture of the subject taken from right side, and corresponding video 2 is the one taken from left side. Therefore, the corresponding points of PR(x1, y) of standard pixel 5 must be on the right side of the position in corresponding video 2, so necessitates the following relation.

PR(x1) . . . PL(x2)

Then, the followings is described about the second restricting condition. When PL(x2) corresponds PR(x1), the corresponding point of PR(x1+1) must be on the right side of PL(x2). In other words, when PL(x2) corresponds PR(x1), the corresponding point of PR(x1+1) must not be less than PL(x2).

Therefore, under the first restricting condition, the possible MDL standard values on standard line 3 and corresponding line 4 are as follow.

MDL(0, 0), MDL(0, 1), MDL(0, 2),
MDL(1, 1), MDL(1, 2),
MDL(2, 2),

With this standard value and under the second restricting condition, the possible combination SMDL for one line among all these MDL standard values are restricted to the following combination.

MDL(0, 0)+MDL(1, 1)+MDL(2, 2),
MDL(0, 0)+MDL(1, 2)+MDL(2, 2),
MDL(0, 1)+MDL(1, 1)+MDL(2, 2),
MDL(0, 1)+MDL(1, 2)+MDL(2, 2),
MDL(0, 2)+MDL(1, 2)+MDL(2, 2),

When minMDL(O, x2)s of all corresponding pixels 6, which correspond to standard pixels 5 of first column, on corresponding line 4 and the relative position D(0, x2)s are stored in the line MDL register 23, the cumulative MDL calculation unit 22 reads out the stored minMDL(0, x2) and the D(0, x2) to store in the cumulative MDL standard value register 24, and outputs the next pixel shift signal NR to the standard pixel position calculation unit 13.

When minMDL(1, x2)s of all corresponding pixels 6, which correspond to standard pixels 5 of the second column, on corresponding line 4 and relative position D(1, x2)s are stored in line MDL register 23, cumulative MDL calculation part 22 read out the stored second column minMDL(1, x2) and D(1, x2), and reads out first column minMDL(0, x2) and D(0. x2) which are stored in cumulative MDL standard value register 24. Then, under the two restricting conditions described above, the cumulative MDL calculation unit 22 calculates cumulative standard value, adding the first column minMDL(0, x2) and the second column minMDL(1, x2). The cumulative MDL calculation unit 22 also calculates of relative positions group, combining first column D(0, x2) with the second column D(1, x2) and stores them in the cumulative MDL standard value register 24. Then the cumulative MDL calculation unit 22 outputs the next pixel shift signal NR to the standard pixel position calculation unit 13.

Under the two restricting conditions described above, till the last standard pixel, the cumulative MDL calculation unit 22 adds to cumulative MDL standard value the minMDL(x1, x2) of standard pixel 5 which is calculated this time, and simultaneously, the cumulative MDL calculation unit 22 combines the last relative position group with the ones which are calculated this time.

As shown in FIG. 6(b), cumulative MDL standard value of all standard pixels 5 on standard line 3,(SMDL), and the corresponding relative position group are stored in cumulative MDL standard value register 24.

When SMDL and the corresponding relative position group are stored in the cumulative MDL standard value register 24, the cumulative MDL calculation unit 22 specifies the minimum SMDL among the stored SMDLs and outputs relative position group corresponding the specified SMDL.

(Function)

Figure 7:
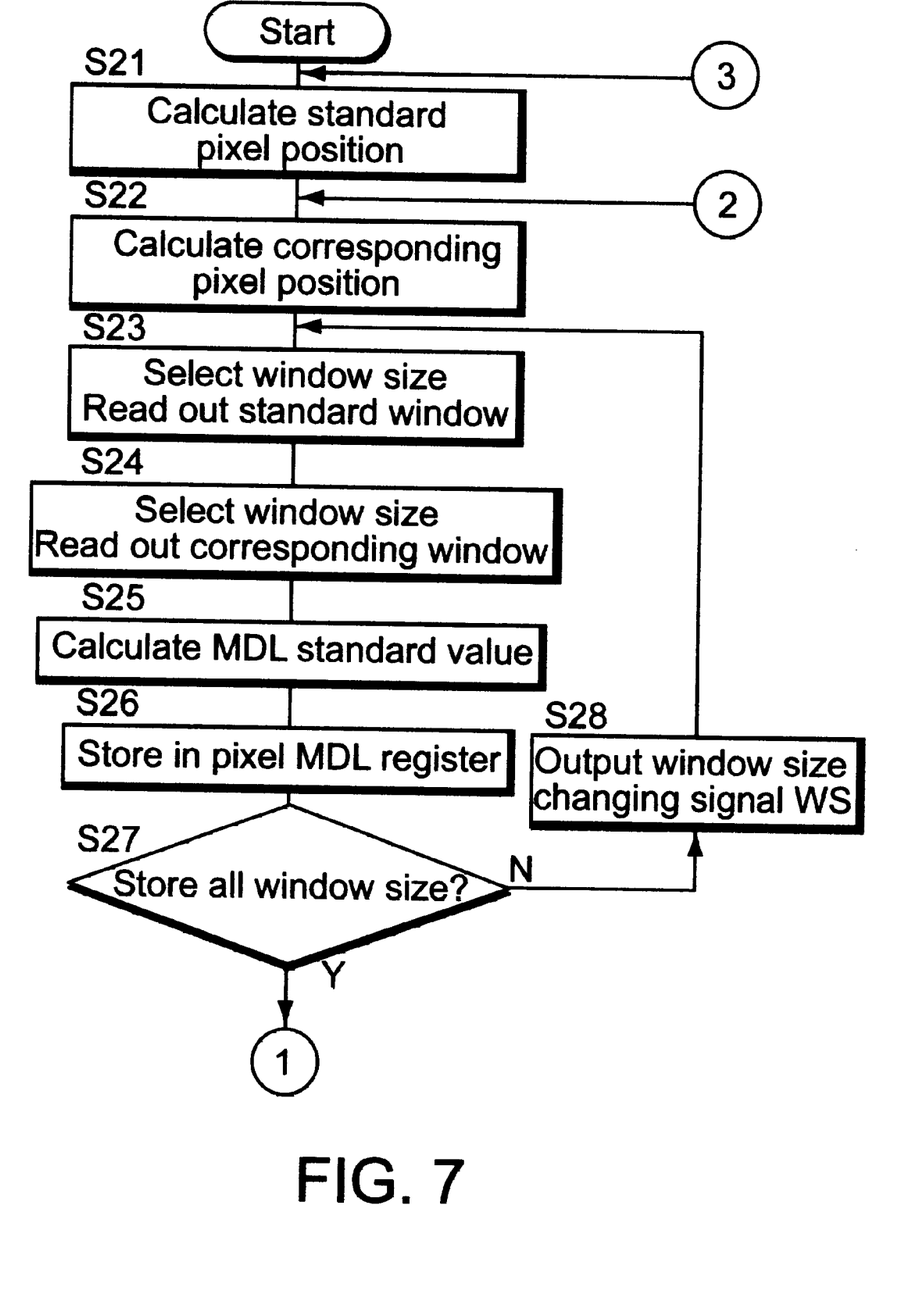
FIG. 7 is a flowchart NO.1 showing the function flow of the second embodiment video signal processing apparatus.
Figure 8:
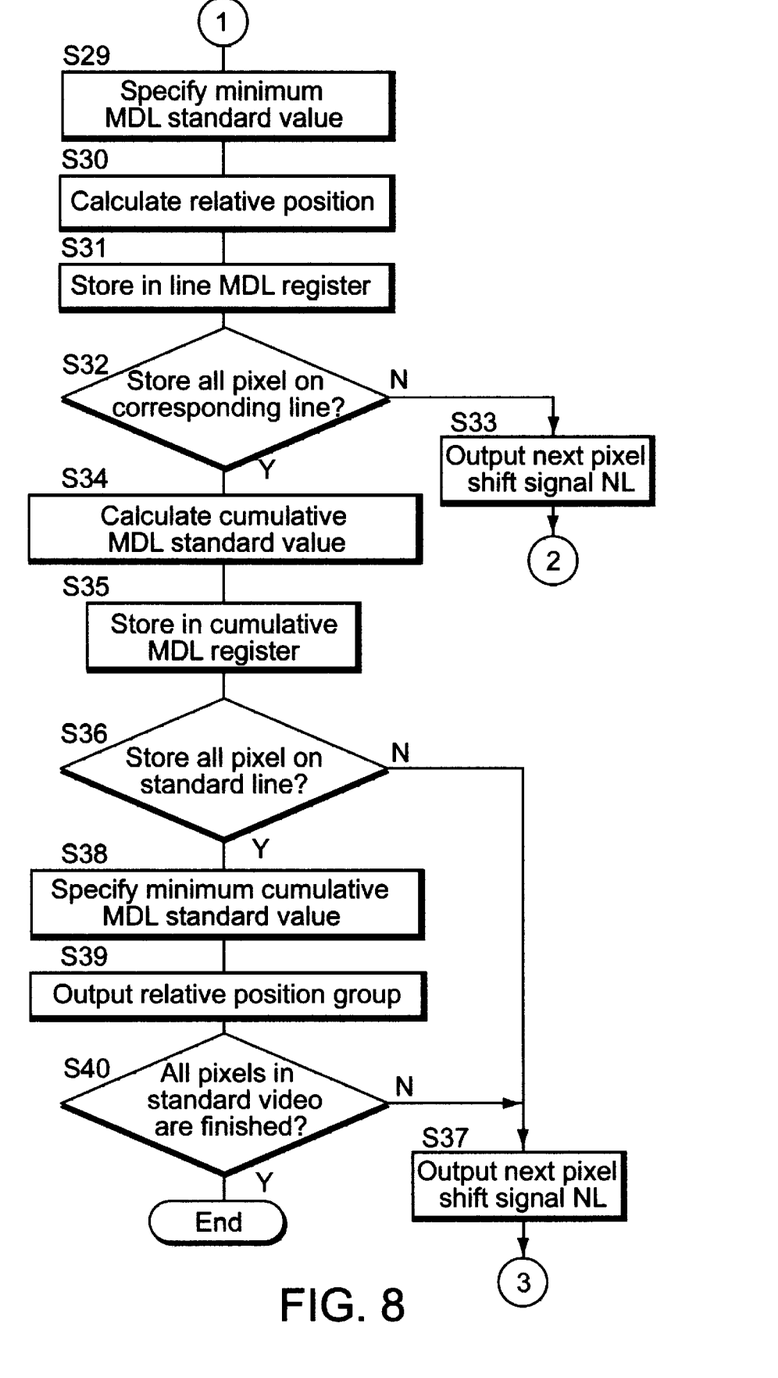
FIG. 8 is a flowchart NO.2 showing the function flow of the second embodiment video signal processing apparatus.

FIG. 7 and FIG. 8 are a flowchart showing the function of the second embodiment.

Step S21~S29 are same with S1~S8 shown in FIG. 4 respectively. Explanation of them are omitted.

In step S29, the minimum MDL standard value, minMDL (x1, x2), is specified among MDL standard values of 4 kinds of window size stored in pixel MDL register 18, by MDL calculation unit 21. Together with the specified minMDL (x1, x2), PR(x1, y) of standard pixel 5 and PL(x2, y) of corresponding pixel 6 are output to cumulative MDL calculation unit 22.

Next, relative position D(x1, x2) of standard pixel 5 and corresponding pixel 6 is calculated by the cumulative MDL calculation unit 22(step S30), and stored in the line MDL register 23 with MDL standard value(step S31).

After that, it is checked whether minMDL(x1, x2)s of all corresponding pixel 6 on corresponding line 4 are stored in the line MDL register 23 or not(step S32).

In step S32, if minMDL(x1, x2)s of all corresponding pixel 6 on corresponding line are not stored in the line MDL register 23, the next pixel shift signal NL is output to corresponding pixel position calculation unit 14 from the cumulative MDL calculation unit 22(step S33), and flow goes back to step S22.

On the other hands, if minMDL(x1, x2)s of all corresponding pixel 6 on corresponding line 4 are stored in the line MDL register 23, by the cumulative calculation unit 22, minMDL(x1, x2) of this time standard pixel 5 is added to the cumulative MDL standard value till the last standard pixel 5 and D(x1, x2) of this time standard pixel is combined with the relative position group of the last standard pixel 5(step S34), and they are stored in the cumulative MDL standard value register 24(step S35).

Next, it is checked whether cumulative MDL standard value of all standard pixels 5 on standard line 3, or SMDL, is calculated or not(step S36). In step S36, when SMDL is not calculated, the next pixel shift signal NR is output from the cumulative MDL calculation unit 22 to the standard pixel position calculation unit 13(step S37), and flow goes back to step S21.

On the other hands, in step S36, when SMDL is calculated, minimum SMDL is specified among the SMDLs which are stored in the cumulative MDL standard value register 24(step S38), and relative position group corresponding to the specified the minimum SMDL are output from cumulative MDL calculation unit 22(step S39).

Next, the existence of the next standard pixel 5 in standard video 1 is checked (step S40). In step S40, if there is next standard pixel 5 in standard video 1, flow goes to step S37, and goes back to step S21. On the other hands, in step S40, if there is no next standard pixel 5 in standard video 1, end the process.

Effect of the Second Embodiment

As described above, according to the second embodiment, applying a dynamic planning method, each cumulative MDL standard value of standard pixel 5 on standard line 3 and corresponding pixel 6 on corresponding line 4 is calculated under the above mentioned two restricting conditions. The minimum SMDL is specified among the calculated SMDLs, and the corresponding position on standard line 3 is searched.

Therefore, because it is available to prevent that each corresponding position of each standard pixel 5 on standard line 3 becomes in reverse relation, higher precise search can be executed, preventing from false corresponding.

In the each cases of above described, searching range may be found on corresponding line 4, but searching range may be a fixed part of pixel column on the line. The searching range may be set considering parallax between standard video 1 and corresponding video 2.

In the second embodiment, cumulative MDL, SMDL, standard value are calculated with a unit of standard line 3. But SMDL may be calculated with a unit of a fixed part of pixel column on the standard line 3.

Besides, in the above described embodiments, stereo video pair consists from standard video 1 and corresponding video 2 which are taken from the different position in horizontal direction respectively. Stereo video pair need not always be in horizontal direction. For example, it may be in vertical direction, and the restricting conditions in the second embodiment case may be set according to the position relation of stereo video pair.

Furthermore, the inexpensive video signal processing apparatus can be supplied by using computer operation. In this case, the above mentioned processing method can be realized by preparing a program for each embodiment to execute, and by memorizing it in flexible disc, hard disc, RAM and ROM.

What is claimed is:

1. A video signal processing method used for a stereo video including a standard video having a plurality of pixels and a corresponding video having a plurality of pixels corresponding thereto, for detecting a corresponding pixel in the corresponding video which corresponds to a standard pixel in the standard video, the video processing method comprising the steps of:

preparing a standard window with a given size surrounding a standard pixel among the plurality of pixels in the standard video;

selecting a plurality of candidate pixels among the plurality of pixels in the corresponding video;

preparing a plurality of candidate windows, each having the same size as the standard window and surrounding each candidate pixel in the corresponding video;

calculating a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window; and identifying the candidate pixel surrounded by the candidate window having the smallest MDL value as the pixel corresponding to the standard pixel.

2. A method as set forth in claim 1, wherein the MDL standard value is calculated by the following operational equation.

$$MDL = \frac{1}{n}\left\{-\log_e Q + \frac{1}{2}K\log_e n\right\} \quad (1)$$

K: numbers of model parameter, $$q_k = \frac{1}{\sqrt{2\pi a^2}} \exp\left(-\frac{\varepsilon_k^2}{2\sigma^2}\right)$$

n: numbers of prediction error, $$\varepsilon_k = Y_{Lk} - Y_{Rk}, \quad (i = 1, 2, \cdots, n)$$

$$Q = q_1 q_2 \cdots q_n, \quad \sigma^2 = \frac{1}{n}\sum_{k=1}^{n} ek$$

3. A video signal processing method used for a stereo video including a standard video having a plurality of pixels and a corresponding video having a plurality of pixels corresponding thereto, for detecting a corresponding pixel in the corresponding video which corresponds to a standard pixel in the standard video, the video processing method comprising the steps of:

selecting a standard pixel column, including plurality of neighboring standard pixels being lined up in the standard video and selecting the corresponding pixel column, including the same number of neighboring corresponding pixels being lined up in the corresponding video, preparing a standard window with a given size surrounding a standard pixel among the plurality of pixels in the standard pixel column;

selecting a plurality of candidate pixels among the plurality of pixels in the corresponding pixel column;

preparing a plurality of candidate windows, each having the same size as the standard window and surrounding each candidate pixel in the corresponding video;

calculating a MDL (Minimum Description Length) standard value using pixel values of all the pixels in the standard window, pixel values of all the pixels in the candidate window, and the size thereof for each using pixel values of all the pixels in the standard window, pixel values of all the pixels in the candidate window, and the size thereof for each candidate window, a smaller MDL standard value representing a larger similarity between the former window and the latter window; and identifying the candidate pixel surrounded by the candidate window having the smallest MDL value as the pixel corresponding to the standard pixel.

4. A method as set forth in claim 3, wherein the standard pixels are permitted to be repeatedly selected, and the corresponding pixels are permitted to be repeatedly prepared.

5. A method as set forth in claim 3, wherein the corresponding pixels are prepared within restricted condition to prevent inconsistency in arrangement of selecting the pair of the standard pixel and corresponding pixel.

6. Computer readable memory medium storing computer program to execute the video signal processing, the features of which is to have step of;

preparing a stereo video including a standard video having a plurality of pixels and a corresponding video having a plurality of pixels corresponding thereto, for detecting a corresponding pixel in the corresponding video which corresponds to a standard pixel in the standard video, the video processing method comprising the steps of:

preparing a standard window with a given size surrounding a standard pixel among the plurality of pixels in the standard video;

selecting a plurality of candidate pixels among the plurality of pixels in the corresponding video;

preparing a plurality of candidate windows, each having the same size as the standard window and surrounding each candidate pixel in the corresponding video;

calculating a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window; and identifying the candidate pixel surrounded by the candidate window having the smallest MDL value as the pixel corresponding to the standard pixel.

7. A video signal processing apparatus which includes;

memory which stores a stereo video including a standard video having a plurality of pixels and a corresponding video having a plurality of pixels corresponding thereto, for detecting a corresponding pixel in the corresponding video which corresponds to a standard pixel in the standard video; and calculator which prepares a standard window with a given size surrounding a standard pixel among the plurality of pixels in the standard video, selects a plurality of candidate pixels among the plurality of pixels in the corresponding video, prepares a plurality of candidate windows, each having the same size as the standard window and surrounding each candidate pixel in the corresponding video, calculates a MDL (Minimum Description Length) standard value using pixel values of all the pixels in the standard window, pixel values of all the pixels in the candidate window, and the size thereof for each candidate window, a smaller MDL standard value representing a larger similarity between the former window and the latter window, and identifying the candidate pixel surrounded by the candidate window having the smallest MDL value as the pixel corresponding to the standard pixel.

* * * * *